United States Patent

[11] 3,612,652

| [72] | Inventor | Millard A. Habegger<br>Poughkeepsie, N.Y. |
|---|---|---|
| [21] | Appl. No. | 874,174 |
| [22] | Filed | Nov. 5, 1969 |
| [45] | Patented | Oct. 12, 1971 |
| [73] | Assignee | International Business Machines Corporation<br>Armonk, N.Y. |

[54] NONRECIPROCAL OPTICAL DEVICE
6 Claims, 3 Drawing Figs.

[52] U.S. Cl. .................................................. 350/157,
350/147, 350/152, 356/106 RL
[51] Int. Cl. .................................................. G02f 1/24
[50] Field of Search .................................................. 356/106
RL; 331/94.5; 350/147, 150, 152, 157

[56] References Cited
UNITED STATES PATENTS
2,246,817  6/1941  Sauer .......................... 350/152 X

| 2,346,247 | 4/1944 | Bailey et al. .................. | 350/157 X |
| 2,607,272 | 8/1952 | Bond ............................ | 350/157 |
| 3,449,039 | 6/1969 | Hoffman ...................... | 350/152 X |

*Primary Examiner*—David Schonberg
*Assistant Examiner*—Paul R. Miller
*Attorneys*—Hanifin and Jancin and John F. Osterndorf ABSTRACT: An optical device having the property that if a light beam is propagated at it in one direction the light beam is totally reflected and if the light beam is propagated at it in the reverse direction it is totally transmitted. A birefringent device has its optical axis in a predetermined direction with respect to the location of incidence of a light beam on it. The birefringent device is disposed in a suitable medium having an index of refraction which is substantially the same as the higher index of refraction of the birefringent device. When the light beam is propagated at a predetermined angle with respect to the birefringent device the nonreciprocal operation of the device occurs.

PATENTED OCT 12 1971 3,612,652

INVENTOR
MILLARD A. HABEGGER

BY John F. Ostendorf
ATTORNEY

NONRECIPROCAL OPTICAL DEVICE

BACKGROUND OF THE INVENTION

1. Field of the Invention

This invention relates to nonreciprocal optical devices and, more particularly, to an optical device operative to propagate a light beam through it when the beam is incident in one direction and to reflect the beam when it is incident in another direction.

2. Description of the Prior Art

Optical devices are ordinarily of the reciprocal type. A light beam directed at such a device has the same operation performed on it irrespective of the direction of incidence of the beam. Beam splitters, for example, exist which accept an incident light beam and divide the beam into two discrete beams dependent on the intensity of the incident beam. Irrespective of the direction of incidence of the beam on the device, the same beam splitting operation occurs. Other forms of beam splitting devices discriminate between light of different polarizations in forming the discrete beams. Again, this occurs regardless of the direction of incidence of the light beam. Similarly, devices such as birefringent crystals and electro-optic crystals perform in a reciprocal manner irrespective of the direction of incidence of the light beam on them. Thus all of these devices are bidirectional in nature, operating in reciprocal manner.

SUMMARY OF THE INVENTION

As contrasted with the reciprocal-type optical devices of the prior art, the device of this invention is nonreciprocal. It operates in unidirectional manner. In one condition of operation it acts on an incident light beam in a totally reflective mode of operation. In another condition of operation it acts in a totally transmissive mode of operation.

According to one aspect of the invention, birefringent means are disposed in a medium having an index of refraction in substantial correspondence with the higher index of refraction of the birefringent means. The birefringent means are formed with an optic axis at a particular acute angle with respect to the locations of incidence of the light beam. This particular acute angle depends on the particular material employed as the birefringent means.

When the light beam is incident on the birefringent means in a first direction such that the polarization direction of the beam is substantially parallel to the optic axis, a first mode of operation occurs. Correspondingly, when the light beam is incident on the birefringent means in a second direction, so that the polarization direction of the beam is substantially perpendicular to the optic axis, a second mode of operation results. If the birefringent means is formed of a negative birefringent material the first mode of operation is total reflection by the device and the second mode of operation is total transmission by the device. These modes of operation are reversed if the birefringent means is formed of a positive birefringent material.

According to another aspect of the invention, the birefringent means is a plate of birefringent material having optical window elements on both of its incident faces. A suitable refractive index material is interposed between each element and the juxtaposed face of the plate to provide a nonrefractive interface between the elements. The optical elements are formed with optical windows to permit the entry and exit of the light beam from the device without any optical loss being incurred.

DESCRIPTION OF THE PREFERRED EMBODIMENT

Figure 1:
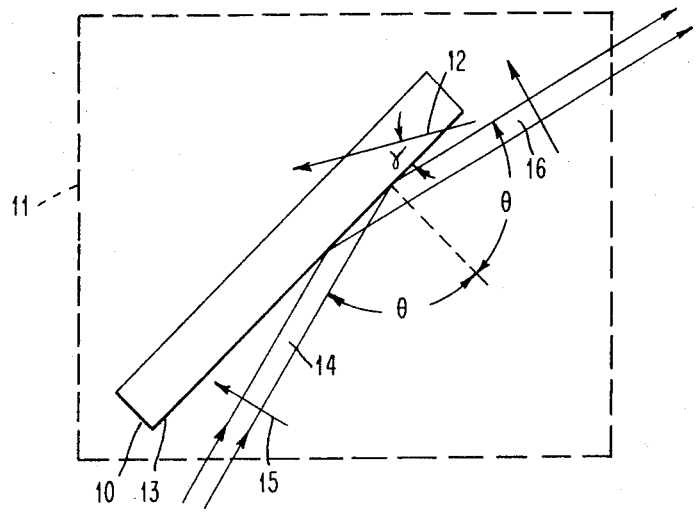
FIG. 1 is a schematic diagram of the nonreciprocal optical device of the invention in one mode of operation.

Referring now to FIG. 1, the optical device according to the invention operates nonreciprocally in unidirectional manner. The device is formed of a birefringent plate 10 immersed in a medium 11 such as a silicone oil. Device 10 is characterized by having an optic axis 12 which forms an acute angle $\gamma$ with the locations of incidence of a light beam on the face 13 of the device. The index of refraction of medium 11 is selected such that it is in substantial correspondence with the higher index of refraction of plate 10.

Light beam 14 is supplied to medium 11 from a suitable source through an optical window such that no optical losses are sustained in entering medium 11. Beam 14 has a polarization state 15 that is linear. The linear polarization state and the optic axis of plate 10 are such as to lie in the same plane. Thus, as shown in FIG. 1, both lie in the plane of the drawing. Beam 14 is directed at incident face 13 at a predetermined angle $\theta$ which is greater than the critical angle for plate 10 to permit the unique property of nonreciprocal operation to occur. The critical angle is determined by the ratio of the lower index of refraction of plate 10 and the refractive index of medium 11 in which plate 10 is immersed. Incident beam 14 encounters the lower index of refraction of plate 10 and is totally reflected with the same linear polarization as beam 16 from incident face 13.

When the material of plate 10 exhibits negative birefringence such as calcite the relationship between the angle $\gamma$ of the optic axis with respect to incident face 13 and the angle of incidence $\theta$ of beam 14 are found to be 17° 20' and 83°, respectively. These angles change with the particular material employed. Thus, sodium nitrate which also exhibits negative birefringence may also be employed as the material of the plate 10 but such a plate would require different values for the angles $\gamma$ and $\theta$.

To obtain total reflection, such as shown in FIG. 1, it is necessary that polarization direction 15 of light beam 14 be substantially parallel to optic axis 12 of plate 10. The reflection occurs since the light beam 14 encounters a refractive index boundary between incident face 13 and medium 11.

Figure 2:
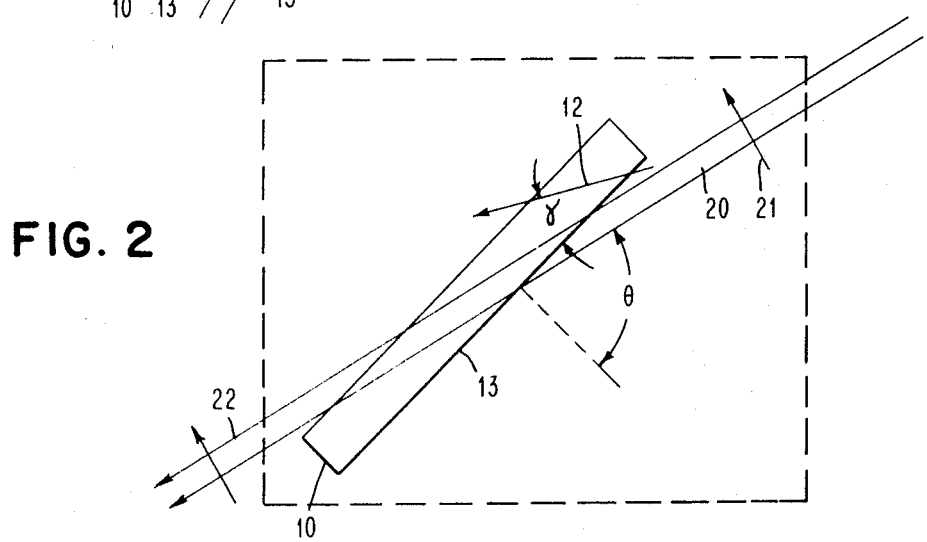
FIG. 2 is a schematic diagram of the device in the other mode of operation.

The second mode of the nonreciprocal operation of the device is shown in FIG. 2. Beam 20 is incident on face 13 from the opposite direction, that is, the direction of the reflected beam 16 of FIG. 1. Polarization direction 21 of beam 20 is substantially perpendicular to optic axis 12 and is in the same plane as optic axis 12. When a negative birefringent material is used as plate 10, beam 20 encounters approximately the ordinary index of refraction of plate 10 which is in substantial correspondence with the index of medium 11 in which the plate is immersed. As a result beam 20 sees no refractive index boundary and is transmitted through plate 10 as beam 22.

As is apparent, this device is unique from other types of optic devices such as the conventional beam splitters. This device depends entirely on the direction of propagation of the incident beam of light and the polarization direction of this incident beam with respect to the optic axis of the device. The device is capable of reflecting substantially 100 percent of the incident energy when operated as shown in FIG. 1 and of transmitting substantially 99 percent of the energy propagated in the reverse direction as shown in FIG. 2.

It is readily apparent that a material exhibiting positive birefringent characteristics may be employed as the birefringent device of the invention. One such material is calomel. When the material of birefringent plate 10 exhibits positive birefringence characteristics, the index of refraction of medium 11 is selected to be in substantial correspondence with the extraordinary index of refraction of the birefringent material. The operation of a positive birefringent device differs from that shown in FIGS. 1 and 2 in that the beam 14 of FIG. 1 is totally transmitted by plate 10 and the beam 20 of FIG. 2 is totally reflected by the plate 10.

For the nonreciprocal operation to occur in the device it is necessary that certain relationships be satisfied. For total reflection to occur the following equation must be satisfied:

$$\eta_{med} X \sin \theta_{crit} = \frac{\eta o}{\sqrt{1 + \left(\frac{\eta o^2}{\eta e^2} - 1\right) \sin^2 \gamma}}$$

For $\theta \geq \theta_{crit}$ and total transmission to occur the following equation must be satisfied:

$$\eta_{med} X \sin \theta = \frac{\eta o \sin \theta'}{\sqrt{1 + \left(\frac{\eta o^2}{\eta e^2} - 1\right) \cos^2 (\gamma + \theta')}}$$

In these equations $\eta_{med}$ is the index of refraction of the medium, $\theta$ is the angle of incidence of the light beam, $\eta o$ is the ordinary index of refraction of the birefringent plate $\eta e$ is the extraordinary index of refraction of the birefringent plate and $\gamma$ is the angle made by the optic axis of the plate with respect to the incident face of the plate. $\theta'$ is the angle of refraction of the incident ray in the birefringent plate when acting in the transmission mode.

Figure 3:
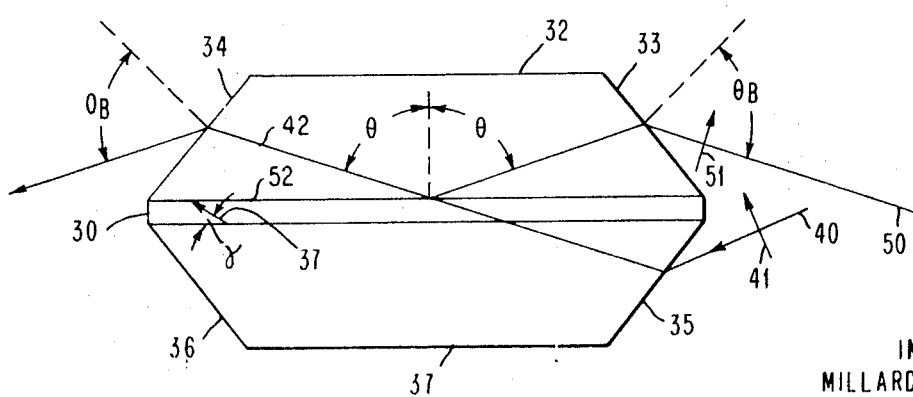
FIG. 3 is a schematic diagram of another form of the device of the invention.

Referring now to FIG. 3, a modified form of the nonreciprocal optical device of the invention is shown in which a birefringent plate 30 is formed with optical elements having optical entry and exit windows, such as glass blocks 31, 32 in juxtaposed relationship with the incident faces of plate 30. The glass blocks are formed with Brewster angle windows 33, 34, 35, 36. The Brewster angle is indicated as $\theta_B$. Interposed between glass blocks 31, 32 and the respective juxtaposed faces of plate 30 is a film of oil having a refractive index equal to the higher index of refraction of plate 30. The glass blocks also have an index of refraction corresponding to the higher index of refraction of the plate 30. If the birefringent material of plate 30 is sodium nitrate the index of refraction of the film of oil and the glass blocks would correspond with the ordinary index of refraction of the material.

The optic axis 37 of plate 30 is formed at an acute angle $\gamma$ with respect to the incident faces of plate 30. For sodium nitrate this angle has been determined to be about 32°.

In operation, an incident light beam 40 having a polarization direction 41 in the same place as optic axis 37 is directed at window 35 of block 31. This beam is totally transmitted as beam 42 through plate 30 as it sees only a very small refractive index boundary between block 31 and plate 30. It is also noted that the polarization direction 41 of beam 40 is substantially perpendicular to optic axis 37. Beam 42 exits from the device through Brewster window 34.

If the beam enters the device as beam 50 through window 33 and having a polarization direction 51, it is totally reflected at the face 52 of plate 30 to form beam 42. In this mode of operation, beam 50 encounters a refractive index boundary at face 52 and thus is totally reflected. The polarization direction 51 of beam 50 is substantially parallel to the optic axis 37 of plate 30. When the material of plate 30 is sodium nitrate it has been determined that the angle of incidence $\theta$ of beam 50 on face 52 approximates 72°.

While the invention has been particularly shown and described with reference to the preferred embodiments thereof, it will be understood by those skilled in the art that the foregoing and other changes in form and details may be made therein without departing from the spirit and scope of the invention. For example, the nonreciprocal optical device of this invention is utilized in an optical circulator and energy converter as described and claimed in U.S. application Ser. No. 874,171 and in a light beam deflector and scanner as described and claimed in U.S. application Ser. No. 874,173. Both of these applications have been filed the same day as this application in the name of M. A. Habegger and are assigned to the same assignee as this invention.

What is claimed is:

1. An optical device operable in nonreciprocal manner on a light beam linearly polarized in a given plane and incident on it, comprising
   a birefringent device having an incident face and disposed in an optical medium having an index of refraction substantially the same as the higher index of refraction of the birefringent device,
   said device having an optic axis lying in the given plane and formed at a predetermined acute angle with respect to said face, said device operating in a first mode when the light beam is propagated to the face in a first direction with its linear polarization state substantially parallel to the optic axis of the device, and said device operating in a second mode when the light beam is propagated to the face in a second direction with its linear polarization state substantially perpendicular to the optic axis of the device.

2. The device of claim 1, wherein the device is a plate of positive birefringent material and the index of refraction of the medium is substantially the same as the extraordinary index of refraction of said device and the first mode of operation is substantially total transmission of the light beam through said device and the second mode of operation is substantially total reflection of the light beam by said device.

3. The device of claim 1, wherein the device is a plate of negative birefringent material and the index of refraction of the medium is substantially the same as the ordinary index of refraction of said device and the first mode of operation is substantially total reflection of the light beam by said device and the second mode of operation is substantially total transmission of the light beam through said device.

4. An optical device operable in nonreciprocal manner on a light beam linearly polarized in a given plane and incident on it, comprising
   a medium having a predetermined index of refraction, and birefringent means with a higher index of refraction substantially the same as said predetermined index, said birefringent means being disposed in said medium and having said light beam incident on the face thereof and having an optic axis formed at a predetermined acute angle to said face and lying in said given plane,
   said light beam being substantially totally reflected at the face of the device when the beam is propagated in a first direction with a linear polarization state having a first relationship to said optic axis and said light beam is substantially totally transmitted at the face of the device when the beam is propagated in a second direction with a linear polarization having a second relationship to said optic axis substantially orthogonal to the first relationship.

5. The device of claim 4, wherein the device is a plate of negative birefringent material and the acute angle of the optic axis of said device with respect to the incident face is determined for both total reflection and total transmission from:

$$\eta_{med} X \sin \theta_{crit} = \frac{\eta o}{\sqrt{1 + \left(\frac{\eta o^2}{\eta e^2} - 1\right) \sin^2 \gamma}}$$

and $\theta \geq \theta_{crit}$ $$\eta_{med} X \sin \theta = \frac{\eta o \sin \theta'}{\sqrt{\left(\frac{\eta o^2}{\eta e^2} - 1\right) \sin^2 (\gamma + \theta')}}$$

where:
$\eta_{med}$ is the index of refraction of the medium;
$\theta_{crit}$ is the critical angle of the material;
$\eta_o$ is the ordinary index of refraction of the material;
$\eta_e$ is the extraordinary index of refraction of the material;
$\gamma$ is the acute angle of the optic axis; and
$\theta'$ is the angle of refraction of the incident ray in the plate when in the transmission mode.

6. A directional beam splitter comprising a birefringent plate having first and second incident faces and an optic axis positioned to form an acute angle with said incident faces, first and second optical elements with optical windows therein and having a refractive index equal to the higher index of refraction of said birefringent plate, and a medium having an index of refraction corresponding to the higher index of refraction of said plate for disposition between a respective one of said elements and a respective one of said faces.